United States Patent
Kwak et al.

(10) Patent No.: US 7,751,502 B2
(45) Date of Patent: Jul. 6, 2010

(54) APPARATUS TO DETECT A SYNC SIGNAL, A VSB RECEIVER USING THE SAME, AND A METHOD THEREOF

(75) Inventors: Jung-won Kwak, Seoul (KR); Dong-hoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1156 days.

(21) Appl. No.: 11/357,335

(22) Filed: Feb. 21, 2006

(65) Prior Publication Data
US 2006/0203944 A1    Sep. 14, 2006

(30) Foreign Application Priority Data
Mar. 11, 2005   (KR) .................. 10-2005-0020562

(51) Int. Cl.
*H04L 27/00* (2006.01)
*H03D 1/00* (2006.01)
(52) U.S. Cl. ........................ 375/326; 375/343
(58) Field of Classification Search ........ 375/150, 375/343, 326, 340, 324, 322, 316, 147, 139, 375/130
See application file for complete search history.

(56) References Cited
U.S. PATENT DOCUMENTS 5,406,586 A    4/1995 Wang
5,877,816 A    3/1999 Kim
6,014,416 A    1/2000 Shin et al.
2003/0067555 A1*  4/2003 Han ..................... 348/558
2003/0138031 A1*  7/2003 Okubo et al. ............ 375/144

FOREIGN PATENT DOCUMENTS

| KR | 100170345 B1 | 10/1998 |
| KR | 2003-0010745 | 2/2003 |
| KR | 10-2004-0032283 | 4/2004 |
| WO | WO 99/31817 | 6/1999 |

OTHER PUBLICATIONS

International Search Report dated Jun. 21, 2006 from Korean Intellectual Property Office with respect to Korean Patent Application No. PCT/KR2006/000846 filed Mar. 9, 2006.

* cited by examiner

*Primary Examiner*—David C Payne
*Assistant Examiner*—Brian J Stevens

(57) ABSTRACT

An apparatus to detect a sync signal, a VSB receiver using the same, and a method thereof. The apparatus includes a plurality of partial correlators to calculate a first partial correlation value between a sub sequence of a training sequence and an "I" signal of a received signal and a second partial correlation value between the sub sequence of the training sequence and a "Q" signal of the received signal, a plurality of squarers to square the first and second partial correlation values for each sub sequence, respectively, a plurality of adders to add the partial correlation values and to provide a correlation signal, a maximum value detection unit to detect a maximum one of the added partial correlation values, and a position detection unit to detect a position of the detected maximum value as the sync signal of the received signal.

14 Claims, 5 Drawing Sheets

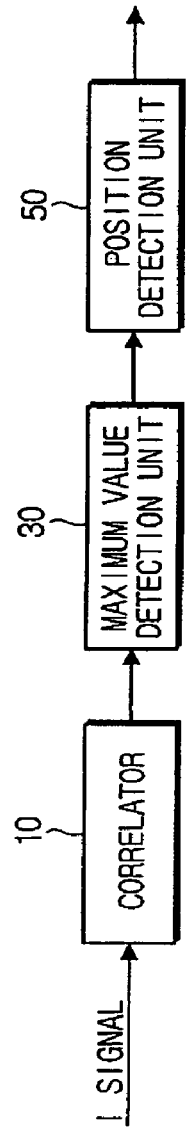
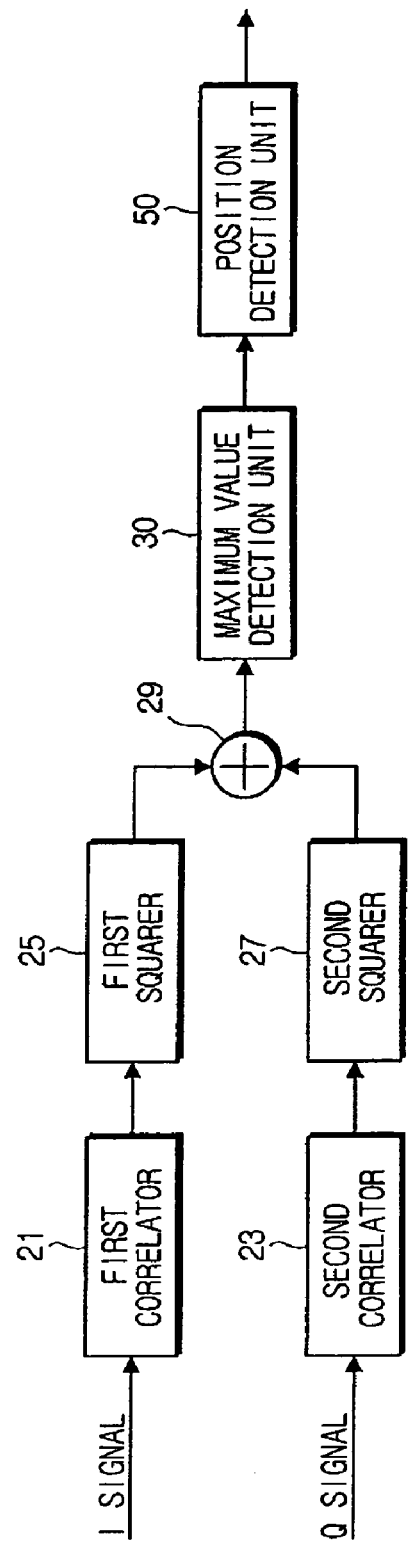

APPARATUS TO DETECT A SYNC SIGNAL, A VSB RECEIVER USING THE SAME, AND A METHOD THEREOF

CROSS-REFERENCE TO RELATED APPLICATIONS

This application claims the benefit under 35 U.S.C. §119 (a) of Korean Patent Application No. 2005-20562, filed Mar. 11, 2005 in the Korean Intellectual Property Office, the entire contents of which are incorporated herein by reference.

BACKGROUND OF THE INVENTION

1. Field of the Invention

The present general inventive concept relates to an apparatus to detect a sync signal, a VSB receiver using the same, and a method thereof, and more particularly to an apparatus to detect a sync signal using a plurality of partial noncoherent correlators, a VSB receiver using the same, and a method thereof.

2. Description of the Related Art

In a receiver for receiving data transmitted in a vestigial side band (VSB) modulation method, a frequency offset and a phase noise generated by a tuner or a radio frequency (RF) oscillator used in the receiver should be minimized in order to demodulate the data. This process is called "carrier recovery." A digital broadcasting system employing the VSB modulation method based on the standard of the Advanced Television System Committee (ATSC), which is an American digital television standard, uses a pilot signal existing in a transmitted signal for carrier synchronization. The pilot signal refers to a signal that is loaded on a carrier during a data transmission in order to accurately recover the carrier.

A process of generating the same clock that is used in a transmitter in order to receive accurate data in the receiver is called "symbol timing recovery."

FIGS. 1A and 1B each illustrate an operation of detecting a sync signal in a conventional VSB receiver. FIG. 1A is a block diagram illustrating a sync detection unit that uses a correlation of an "I" signal, and FIG. 1B is a block diagram illustrating a sync detection unit that uses a noncoherent correlation.

Referring to FIG. 1A, the sync detection unit that uses the correlation of the "I" signal includes a correlator 10, a maximum value detection unit 30, and a position detection unit 50.

The correlator 10 calculates a correlation value between the "I" signal that is a received real signal and a reference signal.

The maximum value detection unit 30 detects a maximum value among the correlation values calculated by the correlator 10.

The position detection unit 50 detects a position where the maximum value is detected, as a start point where effective data exists.

Accordingly, sync detection using the correlation of the "I" signal can be calculated using Equation (1), $$\sum_{k=i}^{i+N-1} r(k)p(k) \quad (1)$$

where r(k) represents the received real signal that corresponds to the "I" signal, p(k) represents the reference signal, N represents a number of samples of the received signal, and k is an index.

Accordingly, after the correlation value between the "I" signal being the received real signal and the reference signal is calculated as in Equation (1), a value "i" that corresponds to the maximum correlation value can be detected using Equation (1), thereby obtaining the sync signal.

Referring to FIG. 1B, the sync detection unit that uses the noncoherent correlation includes a first correlator 21, a second correlator 23, a first squarer 25, a second squarer 27, an adder 29, a maximum value detection unit 30, and a position detection unit 50.

The first and second correlators 21 and 23 calculate a first correlation value between the "I" signal of the received signal and the reference signal, and a second correlation value between a "Q" signal of the received signal and the reference signal, respectively.

The first and second squarers 25 and 27 square the correlation value calculated by the first correlator 21 and the correlation value calculated by the second correlator 23, respectively.

The adder 29 adds the value calculated by the first squarer 25 to the value calculated by the second squarer 27.

The maximum value detection unit 30 detects a maximum one of output values of the adder 29, and the position detection unit 50 detects a position of a signal having the maximum value detected by the maximum value detection unit 30.

Accordingly, in the sync detection method that uses the noncoherent correlation, the correlation can be calculated using Equation (2), $$\left[\sum_{k=i}^{i+N-1} r(k)p(k)\right]^2 + \left[\sum_{k=i}^{i+N-1} r'(k)p(k)\right]^2 \quad (2)$$

where r(k) represents the received real signal, r'(k) represents a received imaginary signal, p(k) represents the reference signal, N represents the number of samples of the received signal, and k is an index.

Accordingly, as in Equation (2), the correlation value between the "I" signal and the reference signal is calculated and is then squared, and the correlation value between the "Q" signal and the reference signal is calculated and is then squared. Further, a value "i" that corresponds to a maximum one of the added values of each of square values can be detected, thereby obtaining the sync signal. In other words, it can be determined that the effective data is positioned after a point of "i".

However, in the sync detection method described with reference to FIG. 1A, that uses the correlation of the "I" signal as the received real signal, the sync signal is detected using only the received real signal and therefore, influence by the phase noise cannot be removed. In other words, in the sync detection method using the correlation of the received real signal ("I" signal), the sync signal is detected using only the "I" signal, and not using the "Q" signal and therefore, there is a drawback in that the sync signal with the phase noise is detected, thereby making it impossible to detect an accurate sync signal. Specifically, in the case where a phase is twisted at ±90°, error between a data frame and a maximum value of a coherent correlation can be also one symbol.

The sync detection method described with reference to FIG. 1B that determines the noncoherent correlation, uses all of the "I" signal as the real signal and the "Q" signal as the imaginary signal, and is generally used when the phase noise exists in the received signal. The sync detection method that uses the noncoherent correlation is based on an aspect that the imaginary signal has no relation between a magnitude and a phase, thereby removing the influence of the phase noise from the received signal and detecting the sync signal.

In particular, the correlation value of the "I" signal and the correlation value of the "Q" signal are squared by the first squarer 21 and the second squarer 23, respectively, and then the respective squared values are added together by the adder 29, so that phase portions are removed from the "I" signal and the "Q" signal having a phase difference of 90° therebetween, thereby not reflecting the phase noise in sync detection.

However, in the case where the phase noise and the carrier frequency offset both exist in the received signal, the sync signal cannot be detected accurately even in the sync detection method using the noncoherent correlation. In other words, there is a drawback in that since the correlation value is varied by the carrier frequency offset, the sync signal cannot be accurately detected. In the case where the carrier frequency offset exists in the received signal, the correlation value can be expressed as in Equation (3), $$\left[\sum_{k=i}^{i+N-1} r(k)p(k)\right]^2 + \left[\sum_{k=i}^{i+N-1} r'(k)p(k)\right]^2 \quad (3)$$

$$= \left[\sum_{k=i}^{i+N-1} p(k)\cos(2\pi f_0 t)p(k)\right]^2 +$$

$$\left[\sum_{k=i}^{i+N-1} p(k)\sin(2\pi f_0 t)p(k)\right]^2$$

$$= \left[\sum_{k=i}^{i+N-1} \cos(2\pi f_0 t)\right]^2 + \left[\sum_{k=i}^{i+N-1} \sin(2\pi f_0 t)\right]^2$$

where r(k) represents the received real signal, r'(k) represents the received imaginary signal, p(k) represents the reference signal, N represents the number of samples of the received signal, k is an index, and $f_0$ represents the carrier frequency offset.

As illustrated in Equation (3), when the carrier frequency offset ($f_0$) exists, even in the case where frame synchronization is accurate, the correlation value is varied by the carrier frequency offset ($f_0$). In the case where the frame synchronization is accurate, a sum of the square value of the correlation value of the "I" signal and the square value of the correlation value of the "Q" signal should be "1." However, the sum of the respective square values does not become "1" due to the carrier frequency offset ($f_0$) and therefore, the sync signal cannot be accurately detected.

SUMMARY OF THE INVENTION

The present general inventive concept provides an apparatus that detects a sync signal using a noncoherent correlator in a vestigial side band (VSB) receiver by calculating a correlation value between a training sequence divided into a plurality of sub sequences and a received signal using a plurality of partial correlators, and detecting the sync signal accordingly, and a method thereof.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing an apparatus to detect a sync signal, the apparatus including a plurality of partial correlators to calculate a first partial correlation value between a sub sequence of a training sequence that is divided into a predetermined number of sub sequences and an "I" signal of a received signal that corresponds to a range of the sub sequence and a second partial correlation value between the sub sequence of the training sequence and a "Q" signal of the received signal, and to calculate the first partial correlation value and the second partial correlation value for each of the respective predetermined number of sub sequences, a plurality of squarers to square the first and second partial correlation values for each sub sequence, respectively, a plurality of adders to add the squared first and second partial correlation values for each sub sequence and to add the added squared partial correlation values of all the sub sequences to provide a correlation signal between the training sequence and a corresponding portion of the received signal, a maximum value detection unit to detect a maximum one of the added partial correlation values of the predetermined number of sub sequences from the correlation signal, and a position detection unit to detect a position of the detected maximum value as the sync signal of the received signal.

The training sequence may include one of a pseudo noise signal, a field sync signal, and a segment sync signal.

The predetermined number may be a number capable of excluding influence of a carrier frequency offset from the detected sync signal, and of keeping a correlation value between the training sequence and the received signal within a predetermined accuracy range.

The foregoing and/or other aspects of the present general inventive concept are also achieved by providing a sync signal detection apparatus usable with a VSB receiver, the apparatus including a partial correlation unit to calculate a plurality of partial correlation signals between a plurality of portions of a received signal and a plurality of corresponding portions of a training sequence, and an adding unit to add the plurality of partial correlation signals to determine a correlation signal.

The foregoing and/or other aspects of the present general inventive concept are also achieved by providing a VSB (vestigial side band) receiver, including a sync signal detection unit having a partial correlation unit to calculate a plurality of partial correlation signals between a plurality of portions of a received signal and a plurality of corresponding portions of a training sequence, an adding unit to add the plurality of partial correlation signals to determine a correlation signal, and a detection unit to detect a position of a maximum value of the correlation signal as a position of a sync signal; a carrier recovery unit to compensate for a frequency using a frequency offset estimated based on the received signal and the detected position of the sync signal; a symbol timing recovery unit to detect a start point and an end point of a symbol of the received signal based on the received signal and the detected position of the sync signal; and an equalizer to remove a multi-path of the received signal depending on a channel environment based on the detected position of the sync signal.

The foregoing and/or other aspects of the present general inventive concept are also achieved by providing a VSB (vestigial side band) receiver including a down converter to convert a signal received through an antenna into a baseband signal, a sync detection unit to add a first square value of a first partial correlation value between a sub sequence of a training sequence that is divided into a predetermined number of sub sequences and an "I" signal of the received signal that corresponds to a range of the sub sequence to a second square value of a second partial correlation value between the sub sequence of the training sequence and a "Q" signal of the received signal, to detect a maximum one of added values of the square values added for all the predetermined number of sub sequences, and to detect a sync signal according to the detected maximum added value, a carrier recovery unit to compensate for a frequency using a frequency offset estimated based on the received signal and the detected sync signal, a symbol timing recovery unit to detect a start point and an end point of a symbol of the received signal based on the received signal and the detected sync signal, an equalizer to remove a multi-path of the received signal depending on a channel environment based on the detected sync signal, and a decoding unit to perform error correction decoding of the received signal having the multi-path removed therefrom.

The foregoing and/or other aspects of the present general inventive concept are also achieved by providing a method of detecting a sync signal, the method including calculating a first partial correlation value between a sub sequence of a training sequence that is divided into a predetermined number of sub sequences and an "I" signal of a received signal that corresponds to a range of the sub sequence, calculating a second partial correlation value between the sub sequence of the training sequence and a "Q" signal of the received signal, and calculating the first partial correlation value and the second partial correlation value for each of the predetermined number of sub sequences, squaring the first and second partial correlation values for each sub sequence, respectively, adding the first and second squared partial correlation values for each sub sequence, and adding the added squared partial correlation values of all the sub sequences to provide a correlation signal between the training sequence and a corresponding portion of the received signal, detecting a maximum one of the added partial correlation values of the predetermined number of sub sequences from the correlation signal, and detecting a position of the detected maximum value as the sync signal of the received signal.

The foregoing and/or other aspects of the present general inventive concept are also achieved by providing a sync signal detection method usable in a VSB receiver, the method including calculating a plurality of partial correlation signals between a plurality of portions of a received signal and a plurality of corresponding portions of a training sequence, and adding the plurality of partial correlation signals to determine a correlation signal.

The foregoing and/or other aspects of the present general inventive concept are also achieved by providing a method of detecting a sync signal in a receiver, the method including calculating a plurality of correlation values with respect to a received signal for each of a plurality of sub training sequences obtained by dividing a training sequence, and detecting a sync signal as a maximum correlation value from among the plurality of correlation values.

BRIEF DESCRIPTION OF THE DRAWINGS

The above aspects of the present general inventive concept will be more apparent by describing certain embodiments of the present general inventive concept with reference to the accompanying drawings, in which:

FIGS. 1A and 1B each illustrate an operation of detecting a sync signal in a conventional VSB receiver;

DETAILED DESCRIPTION OF THE PREFERRED EMBODIMENTS

Figure 2:
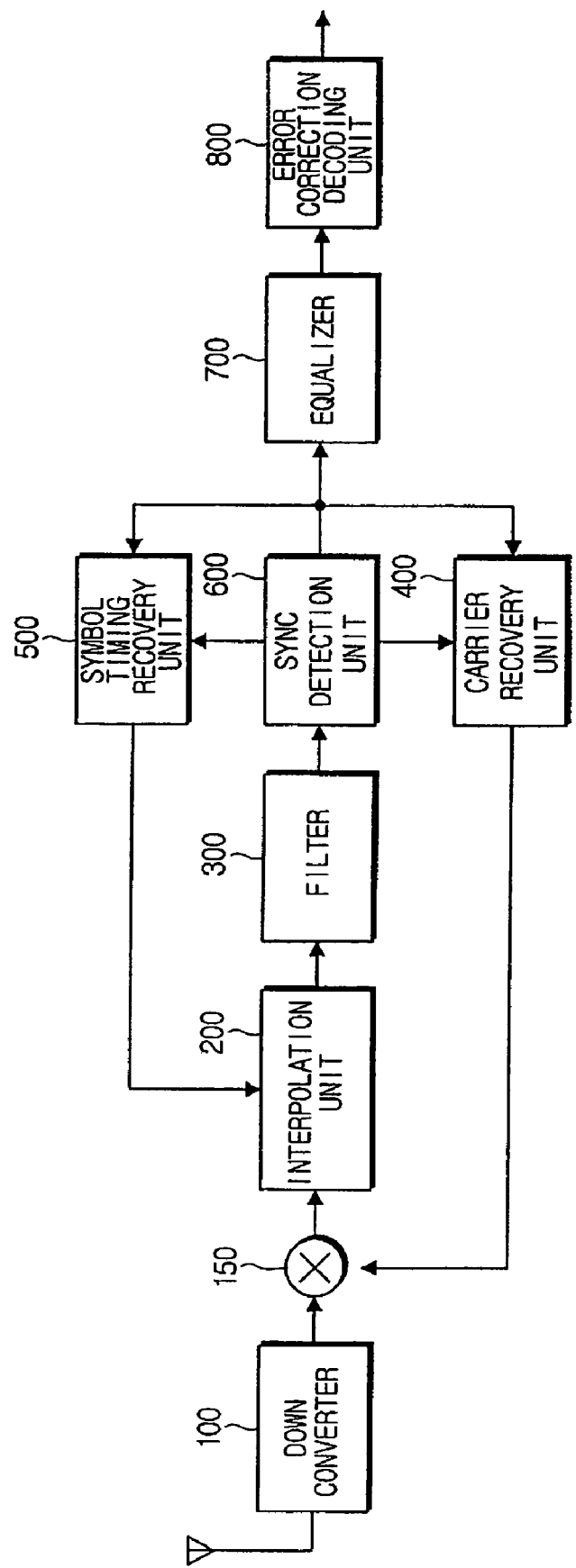
FIG. 2 is a block diagram illustrating a VSB receiver according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 2 is a block diagram illustrating a vestigial side band (VSB) receiver according to an embodiment of the present general inventive concept.

Referring to FIG. 2, the VSB receiver includes a down converter 100, a mixer 150, an interpolation unit 200, a filter 300, a carrier recovery unit 400, a symbol timing recovery unit 500, a sync detection unit 600, an equalizer 700, and an error correction decoding unit 800.

The down converter 100 receives a radio frequency (RF) signal through an antenna and converts the received RF signal into an intermediate frequency (IF) signal, and then again converts the IF signal into a baseband signal, thereby lowering a frequency.

The mixer 150 corrects a frequency of the received signal that is converted into the baseband signal, using a carrier frequency offset detected by the carrier recovery unit 400.

The interpolation unit 200 recovers an accurate symbol timing of the received signal, using a symbol timing offset detected by the symbol timing recovery unit 500.

The filter 300 extracts a desired signal from an output signal of the interpolation unit 200. The filter can be a matched filter.

The carrier recovery unit 400 compensates for a frequency based on a frequency offset (i.e., the carrier frequency offset) estimated using a pilot tone of the received signal.

The symbol timing recovery unit 500 searches for a moment when each symbol starts and ends, using a sync signal and a data signal of the received signal.

The sync detection unit 600 detects a maximum correlation value using a correlation value of a training sequence and the received signal, and then generates a data frame indicator signal from a position having the maximum correlation value as a detected sync signal. Further, the sync detection unit 600 provides position information of the training sequence for the equalizer 700.

At this time, the sync detection unit 600 outputs information about the detected sync signal not only to the equalizer 700 but also to the carrier recovery unit 400 and the symbol timing recovery unit 500, so that the outputted information is used in a carrier recovery operation and a symbol timing recovery operation. In other words, the sync detection unit 600 is positioned to detect the position information of the training sequence prior to sync compensation, and provides the position information of the training sequence to the carrier recovery unit 400 and the symbol timing recovery unit 500, thereby allowing accurate carrier recovery and symbol timing recovery.

The equalizer 700 removes a multi-path of the received signal depending on a channel environment based on an output value of the sync detection unit 600.

The error correction decoding unit 800 performs error correction and decoding of the received signal according to an error correction encoding method of a transmission system.

Figure 3:
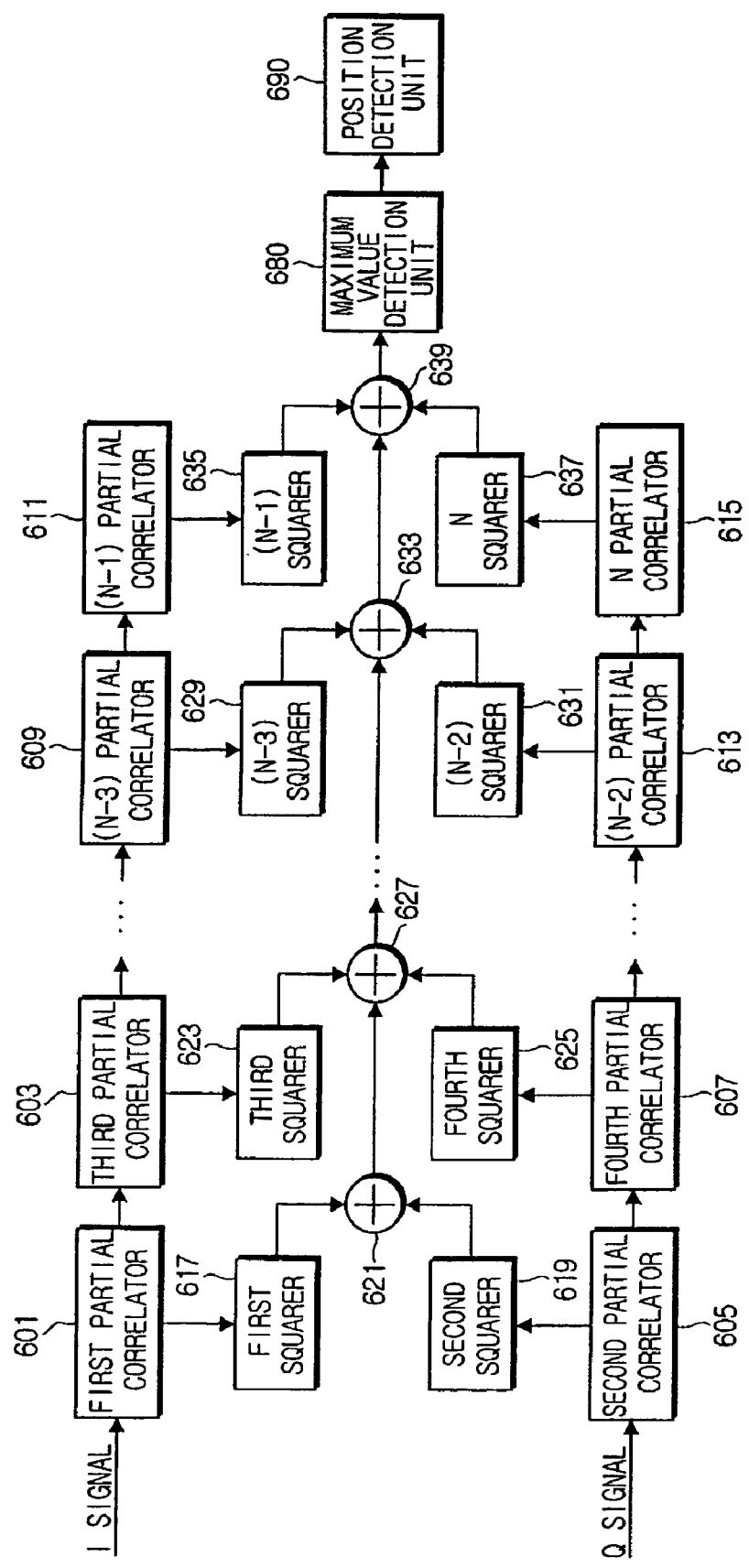
FIG. 3 is a block diagram illustrating a sync detection unit of the VSB receiver of FIG. 2 according to an embodiment of the present general inventive concept.

FIG. 3 is a block diagram illustrating the sync detection unit 600 of FIG. 2, according to an embodiment of the present general inventive concept.

Hereinafter, a description will be made for an exemplary case in which a training signal used (the training sequence) when the sync signal is detected by the sync detection unit 600 of the VSB receiver is a PN511 sequence of a pseudo noise signal. However, it should be understood that other types of training signals can be used with the present general inventive concept.

Referring to FIG. 3, the sync detection unit 600 according to this embodiment includes "n" number of partial correlators 601, 603, etc., "n" number of squarers 617, 619, etc., "n/2" number of adders 621, 627, etc., a maximum value detection unit 680, and a position detection unit 690.

Odd-numbered partial correlators 601, 603, 609, and 611 calculate a correlation value between a predetermined range of the training sequence and a predetermined range of an "I" signal that corresponds to the predetermined range of the training sequence. Even-numbered partial correlators 605, 607, 613, and 615 calculate a correlation value between the predetermined range of the training sequence and a "Q" signal that is a Hilbert transform of the predetermined range of the "I" signal that corresponds to the predetermined range of the training sequence. The training sequence can be, for example, a pseudo noise signal, a segment sync signal, or a field sync signal. The predetermined range refers to a number of samples included in one sub sequence when the PN511 sequence, which is the training sequence, is divided into a predetermined number of sub sequences.

A partial noncoherent correlation value using the partial correlators can be calculated by Equation (4), $$\sum_{i=1}^{N-1} \left[ \left[ \sum_{k=1}^{L} r(L(i-1)+k)p_i(k) \right]^2 + \left[ \sum_{k=1}^{L} r'(L(i-1)+k)p_i(k) \right]^2 \right] \quad (4)$$

where r represents the "I" signal being a received real signal, r' represents the "Q" signal being a received imaginary signal, p(k) represents a pseudo noise signal as the training sequence (PN511 in this exemplary embodiment), L represents the number of samples included in the sub sequence, N represents the predetermined number of sub sequences obtained by dividing the pseudo noise signal (PN511), and k is an index. The sub sequences can be expressed as $p(n) = \{p_1(n_1), p_2(n_2), \ldots, P_N(n_N)\}$. Here, "n" represents a number of a total sequences used when the correlation value is calculated, "$n_i$" represents a number of the sub sequence, and "$n_N$" represents a maximum number of sub sequences. The "$n_N$" is greater than 1, and is less than a value obtained by subtracting a multiplication of the number of sub sequences "n" and the number of samples "L" included in the sub sequence from 511. In other words, a relationship of "$1 \leq n_N \leq 511 - L \cdot N$" is satisfied. That is, the pseudo noise signal of the PN511 sequence is divided by a predetermined number of sub sequences and then, one sub sequence is formed, and remaining samples are not considered. For example, in the case where the PN511 sequence is divided into the sub sequences to allow one sub sequence to have fifty samples, the PN511 sequence is divided into ten sub sequences and remaining eleven samples are not used when the correlation value is calculated.

As illustrated in Equation 4, a sum of square values of the respective sub sequences is calculated by adding the square value of the correlation value between the sub sequence of the divided PN511 sequence and the "I" signal that corresponds to the range of the sub sequence to the square value of the correlation value between the sub sequence of the divided PN511 sequence and the "Q" signal that corresponds to the range of the sub sequence, and then sums of the predetermined number of sub sequences are all added, thereby obtaining a correlation value between the received signal and the PN511 sequence.

At this time, the number of samples "L" included in the sub sequence can determine a range of the carrier frequency offset in which the sync detection unit 600 is capable of accurately detecting the sync signal. If the number of samples "L" included in the sub sequence is increased, the range of the carrier frequency offset in which the sync detection unit 600 is capable of accurately detecting the sync signal is decreased. In other words, if the training sequence is divided into a lesser number of sub sequences, a greater carrier frequency offset is reflected when the correlation value is calculated, thereby making it impossible to accurately detect the sync signal.

On the other hand, if the number of samples "L" included in the sub sequence is decreased, the range of the carrier frequency offset in which the sync detection unit 600 is capable of excluding influence resulting from the carrier frequency offset when the sync signal is calculated is increased. However, since the correlation value is calculated using a plurality of sub sequences, the correlation value may itself be less accurate.

For example, in the case where the number of samples "L" included in the sub sequence is 48, when the carrier frequency offset is more than about ±10 KHz, the correlation value may not be accurately calculated.

The square value of the correlation value of the "I" signal and the square value of the correlation value of the "Q" signal calculated by the plurality of partial correlators 601, 603, 605, 607, 609, 611, 613, and 615 and the plurality of squarers 617, 619, 623, 625, 629, 631, 635, and 637 are added by the plurality of adders 621, 627, 633, and 639. In other words, each odd-even pair of partial correlators (e.g., 601 and 605) partially correlates one sub sequence of the training sequence with the corresponding range of the "I" and "Q" signals to determine a first and a second partial correlation signal. Each of the partial correlation signals are then squared by corresponding odd-even pairs of squarers (e.g., 617 and 619) and added together by the corresponding adder (e.g., 621). The added correlation signals of each sub sequence are then added together by subsequent adders (e.g., 627, 633, and 639) to produce a correlation signal having correlation output values.

The maximum value detection unit 680 detects a maximum one of output values of the adders 621, 627, 633, and 639 (i.e., of the correlation signal) such that the sub sequence having the maximum output value is selected.

The position detection unit 690 detects a position that corresponds to a sub sequence where the maximum value is detected, as a sync signal position that is a start point where effective data exists.

Figure 4:
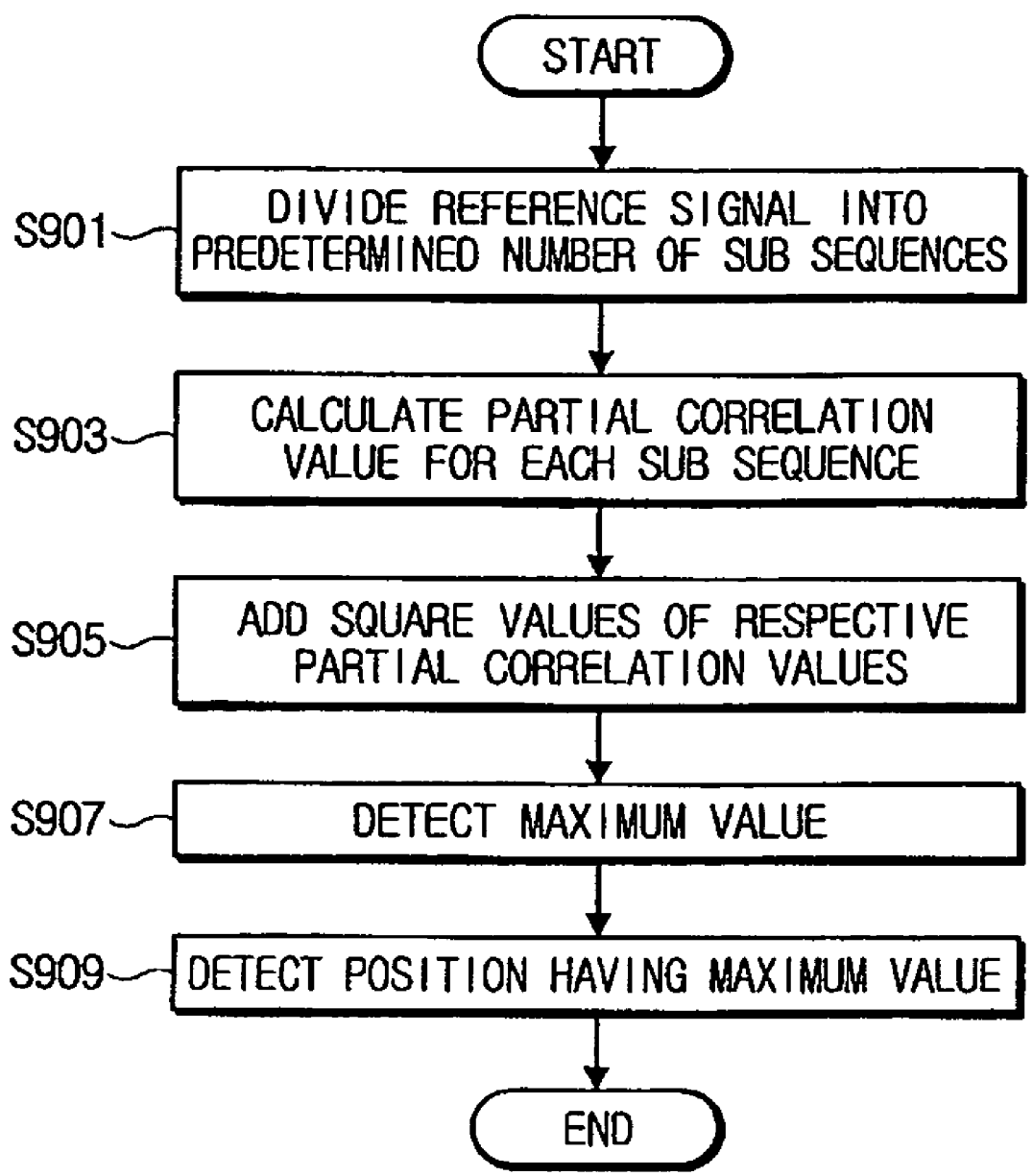
FIG. 4 is a flowchart illustrating a method of detecting a sync signal in a VSB receiver according to an embodiment of the present general inventive concept.

FIG. 4 is a flowchart illustrating a method of detecting the sync signal in a VSB receiver according to an embodiment of the present general inventive concept. The method of FIG. 4 may be performed by the VSB receiver of FIG. 2 and the sync detection unit 600 of FIG. 3. Accordingly, for explanation purposes, the method of FIG. 4 is described below with reference to FIGS. 2 and 3.

Referring to FIG. 4, first, the training sequence used when the sync signal of the received signal is detected is divided into the predetermined number of sub sequences ("N" in Equation 4) (operation 901). The training sequence can be, for example, the pseudo noise signal, the field sync signal, or the segment sync signal.

The predetermined number ("N" in Equation 4) for dividing the training sequence into the sub sequences can determine the range of the carrier frequency offset in which the sync detection unit 600 is capable of accurately detecting the sync signal. If the number of samples ("L" in Equation 4) divided by the lesser number of sub sequences and included in one sub sequence is increased, the range of the carrier frequency offset in which the sync detection unit 600 is capable of accurately detecting the sync signal is reduced.

On the other hand, if the number of samples ("L" in Equation 4) divided by the plurality of sub sequences and included in one sub sequence is decreased, the range of the carrier frequency offset in which the sync detection unit 600 is capable of excluding the influence resulting from the carrier frequency offset when the sync signal is detected is increased. However, since the correlation value (i.e., values of the correlation signal) is calculated using the plurality of sub sequences, the correlation value may itself decrease in accuracy.

Accordingly, the predetermined number ("N" in Equation 4) is determined to be a number capable of excluding the influence resulting from the carrier frequency offset from the sync signal to be detected in order to maintain the correlation value between the training sequence (as a whole) and the received signal within a predetermined accuracy range.

Next, the partial correlation value is calculated for each sub sequence (operation 903). A first partial correlation value between one sub sequence and the "I" signal of the received signal is calculated, and a second partial correlation value between the sub sequence and the "Q" signal of the received signal is calculated. Further, the first partial correlation value and the second partial correlation value are calculated for the other respective sub sequences.

Consequently, the square values of the respective partial correlation values are added (operation 905). That is, the first and the second partial correlation values are squared respectively, and then the respective squared values are added. Further, the added square values for each sub sequence are all added together to determine the correlation signal having the output values.

Next, the maximum one of the output values, obtained by adding the sum of the square value of the first partial correlation value and the square value of the second partial correlation value for each sub sequence, is detected (operation 907). Accordingly, the maximum correlation value of the correlation signal can be detected using the partial noncoherent correlation value between the training sequence and the received signal, thereby excluding the carrier frequency offset from being reflected when the maximum correlation value is detected.

A position having the maximum value is then detected (operation 909). The position having the maximum correlation value between the training sequence and the received signal becomes a position of the sync signal. The position of the sync signal corresponds to one of the sub sequences.

Figure 5A:
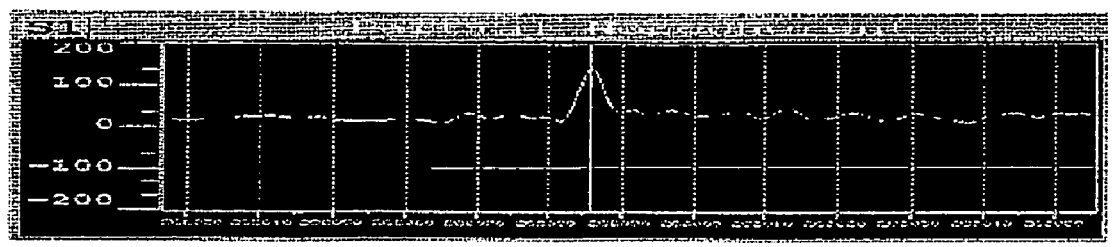
FIGS. 5A to 5C illustrate a result of detecting a sync signal in a VSB receiver according to an embodiment of the present general inventive concept.
Figure 5B:
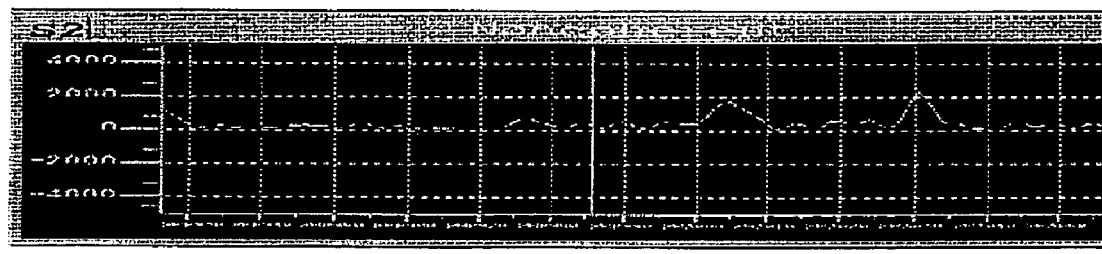
Figure 5C:
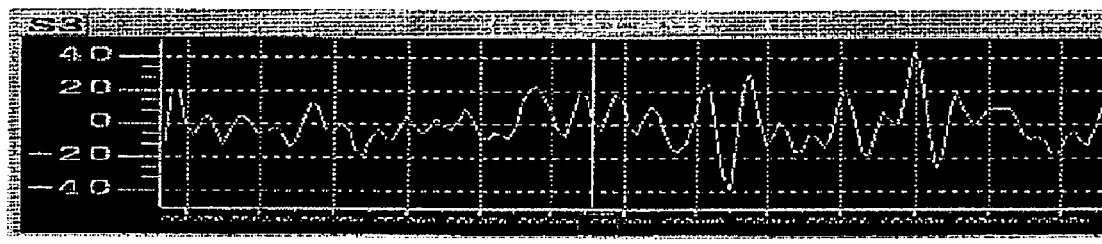

FIGS. 5A to 5C illustrate a result of detecting the sync signal in the VSB receiver according to embodiments of the present general inventive concept. FIG. 5A is a graph illustrating a case where the sync signal is detected using the partial noncoherent correlation value according to the present general inventive concept, FIG. 5B is a graph illustrating a case where the sync signal is detected using a noncoherent correlation value, and FIG. 5C is a graph illustrating a case where the sync signal is detected using a coherent correlation value. Here, a horizontal axis represents time, and a vertical axis represents the correlation value (of the correlation signal).

As illustrated in FIGS. 5A to 5C, in a sync signal detection method using the partial noncoherent correlation value, unlike the sync signal detection method using the coherent correlation value or the noncoherent correlation value, the position having the maximum correlation value, that is, a time having a peak value is clear. Accordingly, in the sync signal detection method using the partial noncoherent correlation value according to the embodiments of the present general inventive concept, the sync signal can be detected with more accuracy in comparison to other sync signal detection methods.

As described above, according to the various embodiments of the present general inventive concept, a correlation value can be calculated for each of a plurality of sub training sequences obtained by dividing a training sequence, and a total correlation value between a received signal and the training sequence can be calculated, thereby excluding an influence resulting from a carrier frequency offset and accurately detecting a sync signal. Further, information about the detected sync signal is used in a carrier recovery operation and a symbol timing recovery operation, thereby performing accurate synchronization compensation using position information of the training sequence.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A sync signal detection apparatus usable with a VSB receiver, the apparatus comprising:
   a partial correlation unit to calculate a plurality of partial correlation signals between a plurality of portions of a received signal and a plurality of corresponding portions of a training sequence, the partial correlation unit having:
      a first plurality of partial correlators to receive an "I" signal of the plurality of portions of the received signal and the corresponding plurality of portions of the training sequence and to produce a plurality of first portions of the correlation signal; and
      a second plurality of partial correlators to receive a "Q" signal of the plurality of portions of the received signal and the corresponding plurality of portions of the training sequence and to produce a plurality of second portions of the correlation signal; and
   an adding unit to add the plurality of partial correlation signals to determine a correlation signal, the adding unit having a plurality of adders each to receive one of the first portions of the correlation signal and one of the second portions of the correlation signal and to add the first and second portions of the correlation signal together with sums of previous first and second portions of the correlation signal output by previous adders such that a last adder outputs the correlation signal as a sum of all the first and second portions of the correlation signal.

2. The apparatus as claimed in claim 1, further comprising:
   a detection unit to detect a position of a maximum value of the correlation signal as a position of a sync signal.

3. The apparatus as claimed in claim 2, wherein the detection unit provides the position of the sync signal to an equalizer, a symbol timing recovery unit, and a carrier recovery unit.

4. The apparatus as claimed in claim 2, wherein the detection unit comprises:
   a maximum value detection unit to detect the maximum value of the correlation signal; and
   a position detecting unit to detect the position of the maximum value of the correlation signal as the position of the sync signal.

5. The apparatus as claimed in claim 1, wherein the partial correlation unit calculates the plurality of correlation signals according to:

$$\sum_{i=1}^{N-1}\left[\left[\sum_{k=1}^{L}r(L(i-1)+k)p_i(k)\right]^2 + \left[\sum_{k=1}^{L}r'(L(i-1)+k)p_i(k)\right]^2\right]$$

where r represents an "I" signal being a received real signal, r' represents a "Q" signal being a received imaginary signal, p(k) represents a pseudo noise signal as the training sequence, N represents a predetermined number of sub sequences obtained by dividing the pseudo noise signal to correspond to the plurality of portions of the training sequence, L represents a number of samples included in each of the sub sequences, and k is an index.

6. The apparatus as claimed in claim 1, wherein the partial correlation unit further comprises:
   a first plurality of squarers to receive the corresponding plurality of first portions of the correlation signal and to square values of the corresponding plurality of first portions of the correlation signal; and
   a second plurality of squarers to receive the corresponding plurality of second portions of the correlation signal and to square values of the corresponding plurality of second portions of the correlation signal.

7. The apparatus as claimed in claim 1, wherein the partial correlation unit divides the training sequence into a plurality of sub training sequences as the plurality of portions of the training sequence.

8. A sync signal detection method usable in a VSB receiver, the method comprising:
   calculating a plurality of partial correlation signals between a plurality of portions of a received signal and a plurality of corresponding portions of a training sequence with a plurality of partial correlators by:
      performing a first plurality of partial correlation operations with at least one of the plurality of partial correlators by receiving an "I" signal of the plurality of portions of the received signal and the corresponding plurality of portions of the training sequence and producing a plurality of first portions of the correlation signal; and
      performing a second plurality of partial correlation operations with at least one of the plurality of partial correlators by receiving a "Q" signal of the plurality of portions of the received signal and the corresponding plurality of portions of the training sequence and producing a plurality of second portions of the correlation signal; and
   adding the plurality of partial correlation signals with at least one adder to determine a correlation signal by performing a plurality of addition operations with at least one adder, each addition operation performed by receiving one of the first portions of the correlation signal and one of the second portions of the correlation signal and adding the first and second portions of the correlation signal together with sums of previous first and second portions of the correlation signal output in previous addition operations such that a last addition operation outputs the correlation signal as a sum of all the first and second portions of the correlation signal.

9. The method as claimed in claim 8, further comprising:
   detecting a position of a maximum value of the correlation signal as a position of a sync signal with a position detection unit.

10. The method as claimed in claim 9, wherein the detecting of the position of the sync signal comprises:
    providing the position of the sync signal to an equalizer;
    providing the position of the sync signal to a symbol timing recovery unit; and
    providing the position of the sync signal to a carrier recovery unit.

11. The method as claimed in claim 9, wherein the detecting of the position of the sync signal comprises:
    detecting the maximum value of the correlation signal with a detection unit; and
    detecting the position of the maximum value of the correlation signal as the position of the sync signal with the position detection unit.

12. The method as claimed in claim 8, wherein the plurality of correlation signals are calculated according to:

$$\sum_{i=1}^{N-1}\left[\left[\sum_{k=1}^{L}r(L(i-1)+k)p_i(k)\right]^2 + \left[\sum_{k=1}^{L}r'(L(i-1)+k)p_i(k)\right]^2\right]$$

where r represents an "I" signal being a received real signal, r' represents a "Q" signal being a received imaginary signal, p(k) represents a pseudo noise signal as the training sequence, N represents a predetermined number of sub sequences obtained by dividing the pseudo noise signal to correspond to the plurality of portions of the training sequence, L represents a number of samples included in each of the sub sequences, and k is an index.

13. The method as claimed in claim 8, wherein the calculating of the plurality of partial correlation signals further comprises:
    performing a first plurality of squaring operations with at least one squarer by receiving the corresponding plurality of first portions of the correlation signal and squaring values of the corresponding plurality of first portions of the correlation signal; and
    performing a second plurality of squaring operations with the at least one squarer by receiving the corresponding plurality of second portions of the correlation signal and squaring values of the corresponding plurality of second portions of the correlation signal.

14. The method as claimed in claim 8, wherein the calculating of the plurality of partial correlation signals comprises dividing the training sequence into a plurality of sub training sequences with at least one of the plurality of partial correlators as the plurality of portions of the training sequence.

* * * * *